United States Patent [19]

Toufuku et al.

[11] Patent Number: 5,785,897
[45] Date of Patent: Jul. 28, 1998

[54] COATING SOLUTION FOR FORMING A TRANSPARENT AND ELECTRICALLY CONDUCTIVE FILM, A TRANSPARENT AND ELECTRICALLY CONDUCTIVE FILM FORMED THEREFROM AND A PROCESS FOR FORMING THE SAME

[75] Inventors: Atsushi Toufuku, Ichikawa; Kenji Adachi, Inzai, both of Japan

[73] Assignee: Sumitomo Metal Mining Co., Ltd., Tokyo, Japan

[21] Appl. No.: 802,570

[22] Filed: Feb. 19, 1997

[30] Foreign Application Priority Data

Apr. 22, 1996 [JP] Japan .................. 8-100080

[51] Int. Cl.$^6$ .................. H01B 1/02; B22F 9/00; F32B 15/04
[52] U.S. Cl. .................. 252/514; 75/255; 428/457; 428/918
[58] Field of Search .................. 252/514; 75/255; 420/502, 505; 428/457, 689, 918, 926

[56] References Cited

U.S. PATENT DOCUMENTS 4,776,883   10/1988   Hayashi et al. .................. 75/0.5 A
4,877,647   10/1989   Klabonde .................. 427/123

FOREIGN PATENT DOCUMENTS 6-279755A   10/1994   Japan .

*Primary Examiner*—Mark Kopec
*Attorney, Agent, or Firm*—Watson Cole Grindle Watson, P.L.L.C.

[57] ABSTRACT

A coating solution for forming a transparent and electrically conductive film contains fine conductive metal or alloy particles dispersed in a polar solvent and having a diameter not exceeding 50 nm. The metal particles are of silver and at least one of palladium, copper and gold. The alloy particles are of an alloy of silver with at least one of palladium, copper and gold. The solution permits the use of a baking temperature which is as low as 150°–450° C.

13 Claims, No Drawings

5,785,897

COATING SOLUTION FOR FORMING A TRANSPARENT AND ELECTRICALLY CONDUCTIVE FILM, A TRANSPARENT AND ELECTRICALLY CONDUCTIVE FILM FORMED THEREFROM AND A PROCESS FOR FORMING THE SAME

BACKGROUND OF THE INVENTION

1. Field of the Invention

This invention relates to a coating solution for forming a transparent and electrically conductive film for imparting an electric-field shielding effect to the front glass of a cathode-ray tube, as of a display unit in an OA apparatus, or of a television receiver, a transparent and electrically conductive film formed therefrom and a process for forming the same. More particularly, it relates to a coating solution prepared by dispersing fine electrically conductive particles containing silver in a polar solvent, and used for forming a transparent and electrically conductive film having a higher level of electric conductivity than any similar film known in the art, and suited for shielding a low-frequency electric field.

2. Description of the Related Art

The recent tendency toward office automation (OA) has brought about the introduction of so many OA apparatus into offices that it is not unusual for many people to work in an office all day facing the display unit of an OA apparatus. The cathode-ray tube (CRT) of a computer is required to have a clearly visible display screen which does not fatigue the eyes of anybody working close to it, and which is free from any dust adherence, or electric shock caused by the accumulation of charge on its surface. Moreover, it is nowadays feared that the low-frequency electromagnetic waves emitted by CRTs may have an adverse effect on the human body, and CRTs not leaking out any such waves are wanted.

The electromagnetic waves are emitted by deflecting coils and flyback transformers, and as television receivers become larger, electromagnetic waves of higher intensity tend to leak out. The leakage of a magnetic field can for the greater part be prevented by, for example, employing a differently shaped deflecting coil.

The leakage of an electric field can be prevented by forming an electrically conductive transparent film on the surface of the front glass of a CRT. This method is based on the same principle with the measure which has hitherto been taken to prevent the accumulation of charge. The electric conductivity of the film is, however, required to be by far higher than that of the film formed for preventing the accumulation of charge. While a film having a surface resistivity of, say, $10^8 \Omega/\square$ is satisfactory for preventing the accumulation of charge, it is necessary to form a transparent film having a low resistivity not exceeding $10^6 \Omega/\square$, and preferably in the order of $10^2$ to $10^3 \Omega/\square$ for preventing the leakage of an electric field.

Several methods have hitherto been proposed to comply with the above requirements. According to one of them, a film of an electrically conductive oxide, such as tin or indium oxide, is formed on the surface of the front glass of a CRT by vacuum evaporation, CVD, sputtering, etc. The film formed by this method has a sufficiently low resistivity for shielding an electric field, since it is of a single material, such as tin or indium oxide, and retains the electric conductivity of its material. Moreover, the film can be formed with so small and uniform a thickness as not to affect the resolving power of the CRT, and as to be easily treated against reflection.

The formation of the film, however, requires a large amount of cost obstructing the manufacture of practically useful CRTs, since it is necessary to prepare an appropriately controlled atmosphere for each individual CRT. Thus, these methods have been considered inadequate except for CRTs intended for special use, and there has been wanted a process for forming a film in a simpler process at a low cost.

A treating solution for forming an electric-field shielding film which is prepared by dispersing a very fine powder of indium tin oxide (ITO) and an alkyl silicate as a binder in a polar solvent consisting mainly of N-methyl-2-pyrrolidone has been proposed as being capable of realizing a low surface reactivity at a low cost (Japanese Laid-Open Patent Application No. Hei 6-279755). If the solution is applied onto the front glass of a CRT, dried, and baked at a temperature not exceeding 200° C., it is possible to form a film having a surface resistivity of $10^3$ to $10^5 \Omega/\square$, depending on its thickness. The application of this ink is a highly beneficial method for the electric-field shielding of a CRT, since it is by far simpler and less expensive than the other methods of forming a transparent and electrically conductive film, such as vacuum evaporation and sputtering. There has, however, been a lower limit to the surface resistivity of the film which can be realized, and it has been difficult to achieve a desirable surface resistivity in the order of $10^2$ to $10^3 \Omega/\square$.

The electrically conductive film is not allowed to impair the transparency or resolution of the screen, and it is also desirable that its transmittance be somewhat controllable. While the transmittance of the front glass of a CRT can be lowered to a certain level to achieve an improved image contrast, it lacks uniformity due to a difference in glass thickness between center and edges, and it is, therefore, desirable that the transmittance of the film formed thereon be adjustable by, say, 10 to 20%. In order to achieve a lower transmittance of light without lowering the resolution, while it is, of course, necessary to produce a uniformly darkened picture, it is desirable that the diffusive scattering of light by the film be minimized, and that its transmittance be lowered by means of the absorption of light by the material of the film.

The solution prepared by employing an ITO powder as described above, however, fails to realize the low transmittance of light having a dark color which is adjustable in brightness, since the powder essentially has the property of transmitting visible light. Thus, the film in which fine particles of ITO are dispersed has been unsatisfactory in electric conductivity and visible-light transmittance controllability.

SUMMARY OF THE INVENTION

It is an object of this invention to provide a coating solution for forming at a low cost by a simple method a transparent and electrically conductive film having the function of restraining the reflection of light on the surface of a CRT screen and the function of lowering its transmittance of visible light without scattering it, and having a higher degree of electric conductivity than any known film to cut off a low-frequency electric field which may have an adverse effect on the human body, a transparent and electrically conductive film formed therefrom and a process for forming it.

The above object is attained by a coating solution comprising fine electrically conductive metal or alloy particles dispersed in a polar solvent and having a diameter not exceeding 50 nm, the metal particles being of silver (Ag) and one or more other metals selected from the group consisting of palladium (Pd), copper (Cu) and gold (Au), or the alloy particles being of a silver alloy formed from silver (Ag) and one or more other metals selected from the group consisting of palladium (Pd), copper (Cu) and gold (Au).

The solution may further contain one or more compounds selected from the group consisting of tin-containing indium oxide, antimony-containing tin oxide and aluminum-containing zinc oxide. The solution may further contain a partially hydrolyzed and polymerized alkyl silicate.

The above object is also attained by a transparent and electrically conductive film formed from any of the solutions as set forth above.

The above object is further attained by a process which comprises coating a base material with any of the solutions comprising metal or alloy particles as set forth above, and with a solution of a partially hydrolyzed and polymerized alkyl silicate, and baking it.

A transparent and electrically conductive film having an electric-field shielding effect can be formed easily at a low cost on the spherical surface of a complete CRT, or the surface of a front glass for a CRT before its sealing if the coating solution of this invention is applied onto the surface, dried, and baked in the air. The film has a single layer, and its strength can be increased by applying thereon a solution containing a partially hydrolyzed and polymerized alkyl silicate. Its baking may be carried out at a temperature of, say, 150°–450° C.

DETAILED DESCRIPTION OF THE INVENTION

The fine electrically conductive particles which are employed for the purpose of this invention consist mainly of silver (Ag), and further contain one or more other metals selected from the group consisting of palladium (Pd), copper (Cu) and gold (Au). The other metal (or metals) may be in the form of films or fine particles covering fine silver particles, or may form an alloy with silver, or may exist as a mixture of those two forms. The metal (or metals) other than silver may be used in the amount of 0.1 to 30% by weight, since less than 0.1% by weight results in a film lacking stability in resistivity, while over 30% by weight results in a film having a high resistivity.

The fine electrically conductive particles have a specific resistivity in the order of $10^{-5}$ to $10^{-6} \Omega$-cm, which is two or three orders lower than that of a transparent and electrically conductive oxide, such as tin-containing indium oxide (ITO), antimony-containing tin oxide (ATO) or aluminum-containing zinc oxide (AZO). The particles form conductive pathes in a film as a result of mutual contact and enable it to realize a resistivity which is lower than that of a film formed from e.g. ITO particles.

Such high conductivity can be expected when a coating solution contains at least 1% by weight of such particles. While a solution containing a larger amount of particles can form a conductive layer having a larger thickness and a lower surface resistivity, no solution containing over 10% by weight of particles is recommendable, since it is difficult to form a film having a smooth interfacial surface and the particles lower their dispersion stability in the solution and form a sediment which is not negligible. It is sufficient to use a solution containing less than, say, 7% by weight of particles in order to form a film having a surface resistivity in the order of $10^2$ to $10^3 \Omega/\square$.

The solution may further contain fine transparent and electrically conductive oxide particles, such as ITO, ATO or AZO particles. These oxide particles serve to form a film having an improved transmittance, though it may have a somewhat higher resistivity. For any application not calling for a great reduction in brightness, it may be sufficient to use a solution consisting mainly of e.g. ITO, ATO or AZO, and containing a small amount of metal or alloy particles.

If the particles have too large a diameter, or are too cohesive, there is formed a hazy film which undesirably lowers the resolution of a CRT display. In order not to lower the resolution of a CRT display, it is usually necessary for a film to be sufficiently clear to have a haze not exceeding 5% as a value indicating the percentage of the amount of scattered transmited light to the total amount of transmitted light.

The haze of a film is substantially proportional to its thickness, and as a result of the use of particles having different diameters, it has been found that a smaller diameter is preferable, and that it is important to use particles having an average diameter not exceeding about 50 nm in order to form a film having a thickness of, say, 0.1 µm and a haze not exceeding 5%. If a film is formed from particles having an average diameter not exceeding 50 nm, the mode in which it scatters incident visible light is, in almost all the cases, of Rayleigh or Mie scattering, and hardly any scattering is due to the shape of the object. On the other hand, a film formed from particles having an average diameter exceeding 50 nm has a haze exceeding 5% easily, since an increased amount of light is scattered by the particles, or the film surface having a higher degree of coarseness.

The film formed from the solution of this invention preferably has a thickness of, say, 0.05 to 0.6 µm. A film having a thickness not exceeding 0.6 µm has a haze exceeding 5%. A uniform film having a thickness which is smaller than 0.05 µm is difficult to form by a process employing an ink. Experiments teach that a film having too small a thickness has an insular particle distribution which increases its surface unevenness and thereby its haze, as well as bringing about a sharp rise in resistivity.

All kinds of electrically conductive particles having a very small diameter as stated above are relatively easy to manufacture, except ITO particles. ITO particles having an average diameter not exceeding 50 nm are generally difficult to manufacture, but are sold and supplied by Sumitomo Metal Mining Co., Ltd.

The coating solution of this invention can be prepared by dispersing fine electrically conductive particles having an average diameter not exceeding 50 nm in a polar solvent to form a highly concentrated dispersion, and mixing it with a polar solvent to dilute it. The dispersion of the particles is preferably carried out by mixing them in the polar solvent in a powerful dispersing machine and deflocculating the majority of flocculent particles into primary particles in a monodisperse state. A ball mill, or attritor sand mill can, for example, be used as the dispersing machine.

The polar solvent which can be used for dispersing the particles is of the type which has an appropriate boiling point not exceeding the baking temperature and can disperse the particles efficiently. Examples are water, N-methyl2-pyrrolidone (NMP), ethanol, 4-hydroxy 4-methyl-2-pentanone (diacetone alcohol), isopropyl alcohol, N, N-dimethylform-amide (DMF), diacetamide, methyl cellosolve, acetone and tetrahydroxyfuran. A small amount of e.g. a silane, titanate, zirconate or aluminate coupling agent, or a polycarboxylic acid, phoshoric ester, or silicone surface active agent can be added as a dispersant for raising the dispersibility of the particles. The dispersant can be added in a small amount not exceeding 1% by weight unless it affects electric conductivity.

The polar solvent used for the diluting purpose is selected from among the solvents which are compatible with the solvent used for the dispersing purpose and also with the dispersant, and have a boiling point not exceeding the baking temperature. The polar solvent for the diluting purpose is employed for improving the applicability of the solution to a base to enable it to form a smooth and uniform film. It will be easy for anybody of ordinary skill in the art to select a suitable solvent.

The partially hydrolyzed and polymerized alkyl silicate is used for bonding and fixing the particles to a glass surface. It is possible to use, for example, an orthoalkyl silicate which has been hydrolyzed and somewhat polycondensed with dehydration. Examples of orthoalkyl silicates are orthomethyl silicate, $Si(OCH_3)_4$; orthoethyl silicate, $Si(OC_2H_5)$; orthopropyl silicate, $Si(OC_3H_7)_4$; and orthobutyl silicate, $Si(OC_4KH_5)_4$. It is also possible to use an ortho-alkyl silicate having two or more alkyl groups in the same molecule, or a mixture of two or more alkyl orthosilicates.

The orthoalkyl silicates are easily hydrolyzed in the presence of water to have their alkoxyl groups converted to hydroxyl groups, and undergo polycondensation with the liberation of water from the hydroxyl groups. A somewhat polymerized product can be used for the purpose of this invention. In short, it is possible to use an orthoalkyl silicate which undergoes polycondensation with dehydration under heat and eventually forms a silica gel, or silica to fix fine electrically conductive particles to a glass surface. Its polycondensation can be promoted in the presence of a small amount of water, or an acid such as hydrochloric or sulfuric acid, as a reaction accelerator.

Although the partially hydrolyzed and polymerized alkyl silicate can be prepared from an orthoalkyl silicate as described above, its starting material is not necessarily limited to an orthoalkyl silicate if a similar product can be obtained. For example, Ethyl Silicate 40 and Methyl Silicate 51 (Tama Chemical Industrial Co., Ltd.) are commercially available, and these compounds can be used as they are, or after further hydrolysis and polycondensation, and appropriate dilution. It is also possible to add a hydrolyzed product of alkoxide, such as titanium, zirconium or aluminum, if necessary.

It is desirable that the above alkyl silicate be added in an amount not exceeding that of the conductive particles in terms of $SiO_2$ as solidified, or that no such silicate be added. Therefore, it is desirable to limit its amount to 10% by weight at maximum, since the amount of the particles in the solution is preferably from 0.1 to 10% by weight. If the solution contains a larger amount of such silicate, it forms a film having a high haze and high resistivity due to the roughening of its interfacial surface or the worsening of the packing density of conductive particles. Although the addition of the alkyl silicate may be useful for improving the applicability of the solution to a base and the adhesion of a film to it, it is not necessary to add it to a solution for forming a first layer in the event that overcoating is done to form a two-layer film having a satisfactorily high surface strength.

After its application onto the face panel of a CRT, the coating solution of this invention is baked at a temperature of 150°–450° C. in the air. It is possible to heat it to a temperature immediately below the softening point of glass to form a film on the front glass of a CRT before its vacuum sealing, but in the event that a film is formed on the spherical surface of a complete CRT after its sealing, it is advisable to employ a heating temperature not exceeding 200° C., since a higher temperature is likely to cause its bursting.

The baking of the solution causes the polycondensation of the silicate, the evaporation of the solvent and the shrinkage, drying and hardening of the film as formed. As the polycondensation of the silicate is completed at a temperature of 200° C. to 250° C., a small amount of ink components unavoidably remain unreacted and unevaporated at a baking temperature not exceeding 200° C. Therefore, it is generally advisable to use a higher temperature if possible, though a considerably strong film can be formed even at a baking temperature not exceeding 200° C. If a baking temperature of 250° C. or above is used, the gel condensation of the silicate and its drying are completed, and the resulting shrinkage of the film allows it to have a higher packing density of conductive particles and a lower surface resistivity. The mutual contacts of the conductive particles are improved with the evaporation of the solvent and improve the stability of the film in resistivity against any change with time.

The coating solution of this invention is a dispersion of fine electrically conductive particles, and is not intended for forming a film of those particles by relying upon the decomposition or chemical reaction of its components by the heat applied for baking. Therefore, it can form a film which is stable in properties and uniform in thickness. Moreover, it enables the formation of such a film at a low temperature as stated above, since it is sufficient to use a baking temperature which promotes the evaporation of the solvent and the dispersant and the polymerization and solidification of the alkyl silicate.

The following is a description of examples in which this invention is embodied. The solution containing a partially hydrolyzed and polymerized alkyl silicate (hereinafter referred to as "silicate solution") which was employed in the following examples had been prepared by mixing 30 parts of Ethyl Silicate 40 manufactured by Tama Chemical Industrial Co., Ltd. and having an average polymerization degree of 4 or 5 and 44 parts of ethanol, and dropping a solution of water and ethanol (46 parts of distilled water+20 parts of ethanol) into their mixture under stirring, and further dropping a mixed solution composed of 10 parts of a 1% by weight aqueous solution for HCl and 7 parts of ethanol. It was appropriately diluted with a solvent, such as ethanol, prior to use. It is, however, to be understood that the silicate solution as described above is merely illustrative, and is not intended for limiting the scope of this invention.

The surface resistivity of each film was measured by employing a surface resistivity meter, MCP-T200, made by Mitsubishi Petrochemical Co., Ltd. Its haze and light transmittance were measured by employing a haze meter, HR-200, made by Murakami Color Technology Research Laboratory. Its reflectance was measured by employing a spectrophotometer made by Shimadzu Seisakusho after painting the rear surface of sheet glass black to restrain its reflection of light. The diameters of fine electrically conductive particles were measured by employing a transmission electron microscope made by JEOL.

EXAMPLE 1

A coating solution, or dispersion containing 2% by weight of fine Ag—Pd particles was prepared by mixing under stirring 15 parts of ultrafine Ag—Pd particles made by Sumitomo Metal Mining Co., Ltd. and having an average diameter of 45 nm (containing 7% by weight of Pd, as determined by chemical analysis), 20 parts of dimethylformamide (DMF) and 5 parts of a silane coupling agent (TSL8802 made by Toshiba Silicone Co., Ltd.) as a dispersant, subjecting the mixture to 100 hours of dispersing action in a ball mill containing zirconia balls having a diameter of 5 mm, and mixing it with ethanol strongly under stirring.

The coating solution was dropped from a beaker onto a sheet of soda-lime glass measuring 200 by 200 by 3 mm and rotating at a speed of 150 rpm, and was baked in the air at a temperature of 180° C. for 30 minutes to form a single-layer film of dispersed Ag—Pd particles. The film had a surface resistivity of $4.4 \times 10^3 \Omega/\square$, a haze of 2.3% and a transmittance of 65%.

EXAMPLE 2

The same coating solution as used in Example 1 was dropped from a beaker onto a sheet of soda-lime glass measuring 200 by 200 by 3 mm and rotating at a speed of 150 rpm, then the silicate solution as described above was dropped onto it, and the solutions were baked in the air at a temperature of 180° C. for 30 minutes to form a two-layer film consisting of a dispersed Ag—Pd layer and an overcoat layer. The film had a surface resistivity of $8.3 \times 10^2 \Omega/\square$, a haze of 1.6% and a transmittance of 68%.

EXAMPLE 3

A coating solution was prepared by using a titanate coupling agent (PRENACT KR138S made by Ajinomoto Corporation) as the dispersant and otherwise repeating Example 1, and a two-layer film was formed by repeating Example 2. The film had a surface resistivity of $4.6 \times 10^3 \Omega/\square$, a haze of 1.5% and a transmittance of 72%.

EXAMPLE 4

A coating solution was prepared by repeating Example 1, and was thoroughly mixed under stirring with the silicate solution in a weight ratio of 95:5, and Examples 1 and 2 were repeated for the spin forming of a film on a sheet-glass base and its baking at 180° C. to form a single-layer film and a two-layer film, respectively. The single-layer film had a surface resistivity of $6.3 \times 10^4 \Omega/\square$, a haze of 2.2% and a transmittance of 65% and the two-layer film had a surface resistivity of $4.5 \times 10^3 \Omega/\square$, a haze of 1.4% and a transmittance of 68%.

EXAMPLE 5

A two-layer film was formed by employing a baking temperature of 400° C. for 30 minutes and otherwise repeating Example 2. The film had a very high level of electric conductivity, as it had a surface resistivity of $6.2 \times 10^2 \Omega/\square$, a haze of 0.9% and a transmittance of 69%.

EXAMPLE 6

A two-layer film was formed by employing ultrafine Ag—Au particles having an average diameter of 34 nm (containing 3.1% by weight of Au, as determined by chemical analysis) and otherwise repeating Example 2. The film had a surface resistivity of $8.7 \times 10^2 \Omega/\square$, a haze of 1.6% and a transmittance of 73%, and was substantially equal in properties to the film formed from the Ag—Pd particles.

EXAMPLE 7

A two-layer film was formed by employing ultrafine Ag—Cu particles having an average diameter of 41 nm (containing 4.5% by weight of Cu, as determined by chemical analysis) and a baking temperature of 350° C. for 30 minutes and otherwise repeating Example 2. The film had a surface resistivity of $1.7 \times 10^3 \Omega/\square$, a haze of 1.4% and a transmittance of 71% and was substantially equal in properties to the film formed from the Ag—Pd particles.

EXAMPLE 8

A two-layer film was formed by employing in a weight ratio of 3:1 the same ultrafine Ag—Pd particles having an average diameter of 45 nm as used in Example 1, and ultrafine ITO particles (ITO-UFP) made by Sumitomo Metal Mining Co., Ltd. and having an average diameter of 25 nm and otherwise repeating Example 2. The film had a surface resistivity of $7.6 \times 10^3 \Omega/\square$, a haze of 3.3% and a transmittance of 77%, and was improved in transmittance over the film formed from the Ag—Pd particles alone, though its surface resistivity was somewhat higher.

EXAMPLE 9

A two-layer film was formed by employing in a weight ratio of 3:1 the same ultrafine Ag—Pd particles having an average diameter of 45 nm as used in Example 1, and ultrafine ATO particles made by Sumitomo Metal Mining Co., Ltd. and having an average diameter of 12 nm and otherwise repeating Example 2. The film had a surface resistivity of $4.7 \times 10^4 \Omega/\square$, a haze of 3.1% and a transmittance of 78%, and was improved in transmittance over the film formed from the Ag—Pd particles alone, though its surface resistivity was somewhat higher.

EXAMPLE 10

A two-layer film was formed by employing in a weight ratio of 3:1 the same ultrafine Ag—Pd particles having an average diameter of 45 nm as used in Example 1, and ultrafine AZO particles made by Sumitomo Metal Mining Co., Ltd. and having an average diameter of 46 nm and otherwise repeating Example 2. The film had a surface resistivity of $5.3 \times 10^4 \Omega/\square$, a haze of 4.1% and a transmittance of 76%, and was improved in transmittance over the film formed from the Ag—Pd particles alone, though its surface resistivity was somewhat higher.

EXAMPLE 11

A coating solution was prepared by mixing under stirring 10 parts of ultrafine Ag—Pd—Cu particles having an average diameter of 35 nm (and containing 2.5% by weight of Pd and 1.8% by weight of Cu as determined by chemical analysis), 30 parts of dimethylacetamide and 4 parts of a silane coupling agent (TSL8802 of Toshiba Silicone Co., Ltd.) as the dispersant and otherwise repeating Example 1. The solution contained 2% by weight of Ag—Pd—Cu particles. A two-layer film was formed from the solution by repeating Example 2. The film had a surface resistivity of $1.4 \times 10^3 \Omega/\square$, a haze of 1.6% and a transmittance of 72%, and was substantially equal in properties to the film formed from the Ag—Pd, Ag—Au or Ag—Cu particles.

COMPARATIVE EXAMPLE 1

A two-layer film was formed by employing only ultrafine ITO particles (ITO-UFP) made by Sumitomo Metal Mining Co., Ltd. and having an average diameter of 19 nm without using any particles containing silver as set forth in claim 1, and otherwise repeating Example 2. The film had a surface resistivity of $8.6 \times 10^3 \Omega/\square$, but was not a dark one, as it had a transmittance of 96%.

COMPARATIVE EXAMPLE 2

A film was formed by employing a highly conductive carbon powder made by Mitsubishi Chemical Co., Ltd. and having an average particle diameter of 8 nm and otherwise repeating Example 2. It had a transmittance of 46% and was a considerably dark film, and its surface resistivity was as high as $3.9 \times 10^8 \Omega/\square$.

As is obvious from the comparison of the foregoing Examples and Comparative Examples, the coating solution of this invention which is prepared by dispersing fine electrically conductive particles containing silver and one or more other metals selected from the group consisting of palladium, copper and gold can form a film having an appropriately low transmittance of light and yet a low haze, and a sufficiently high level of electric conductivity for shielding an electric field, while it is impossible to form a film having the desired properties including surface resistivity, transmittance and reflectance from any solution containing only a transparent and electrically conductive oxide, such as ITO, or a black conductor, such as carbon.

The coating solution of this invention can form a film having both good optical properties and high conductivity in a large quantity and at a low cost even at a baking temperature not exceeding 450° C., and including as low as 150° C., as stated above. The film can be formed on, for example, the surface of the screen of a CRT to provide an effective electric shield for preventing any trouble that might otherwise be caused by the leakage of electromagnetic radiation. Moreover, it enables the CRT to provide a clear display with a low haze. Thus, this invention has a very high level of industrial utility.

What is claimed is:

1. A coating solution for forming a transparent and electrically conductive film which contains fine metal particles as fine conductive particles dispersed in a polar solvent, said metal particles comprising silver (Ag) and 0.1 to 30 wt % basis total fine metal particles of at least one other metal selected from the group consisting of palladium (Pd), copper (Cu) and gold (Au), wherein said silver particles and said at least one other metal particles each have a diameter of 50 nm at maximum, and wherein said coating solution further contains at least one compound selected from the group consisting of tin-containing indium oxide, antimony-containing tin oxide, aluminum-containing zinc oxide and partially hydrolyzed and polymerized alkyl silicate.

2. A coating solution as set forth in claim 1, wherein said coating solution further contains at least one compound selected from the group consisting of tin-containing indium oxide, antimony-containing tin oxide and aluminum-containing zinc oxide.

3. A coating solution as set forth in claim 1 or 2, further containing a partially hydrolyzed and polymerized alkyl silicate.

4. A coating solution as set forth in claim 1 or 2, containing 1 to 10% by weight of said conductive particles.

5. A coating solution as set forth in claim 1 or 2, wherein said conductive particles have a specific resistance in the order of $10^{-5}$ to $10^{-6} \Omega \cdot cm$.

6. A coating solution as set forth in claim 3, containing 0.1 to 10% by weight of said silicate.

7. A coating solution for forming a transparent and electrically conductive film which contains fine alloy particles as fine conductive particles dispersed in a polar solvent, said alloy particles being of a silver alloy formed by adding to silver (Ag) 0.1 to 30 wt % basis total alloy particles of at least one other metal selected from the group consisting of palladium (Pd), copper (Cu) and gold (Au), wherein said alloy particles have a diameter of 50 nm at maximum, and wherein said coating solution further contains at least one compound selected from the group consisting of tin-containing indium oxide, antimony-containing tin oxide, aluminum-containing zinc oxide and partially hydrolyzed and polymerized alkyl silicate.

8. A coating solution as set forth in claim 7, wherein said coating solution further contains at least one compound selected from the group consisting of tin-containing indium oxide, antimony-containing tin oxide and aluminum-containing zinc oxide.

9. A coating solution as set forth in claim 7 or 8, further containing a partially hydrolyzed and polymerized alkyl silicate.

10. A coating solution as set forth in claim 7 or 8, containing 1 to 10% by weight of said conductive particles.

11. A coating solution as set forth in claim 9, containing 0.1 to 10% by weight of said alkyl silicate.

12. A transparent and electrically conductive film formed by employing a coating solution as set forth in claim 1 or 7.

13. A film as set forth in claim 12, having a thickness of 0.05 to 0.6 μm.

* * * * *